A. L. PUTNAM.
METALLIC WHEEL.
APPLICATION FILED FEB. 28, 1918.

1,296,849.

Patented Mar. 11, 1919.

Inventor
Alden L. Putnam

By Whittemore Hulbert + Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

METALLIC WHEEL.

1,296,849.    Specification of Letters Patent.    Patented Mar. 11, 1919.

Application filed February 28, 1918. Serial No. 219,566.

*To all whom it may concern:*

Be it known that I, ALDEN L. PUTNAM, a citizen of the United States of America, residing at Detroit, in the county of Wayne and State of Michigan, have invented certain new and useful Improvements in Metallic Wheels, of which the following is a specification, reference being had therein to the accompanying drawings.

The invention relates to metallic wheels and more particularly to wheels of the disk type, and the invention consists in the novel construction of clamping and driving means as hereinafter set forth.

Figure 1:
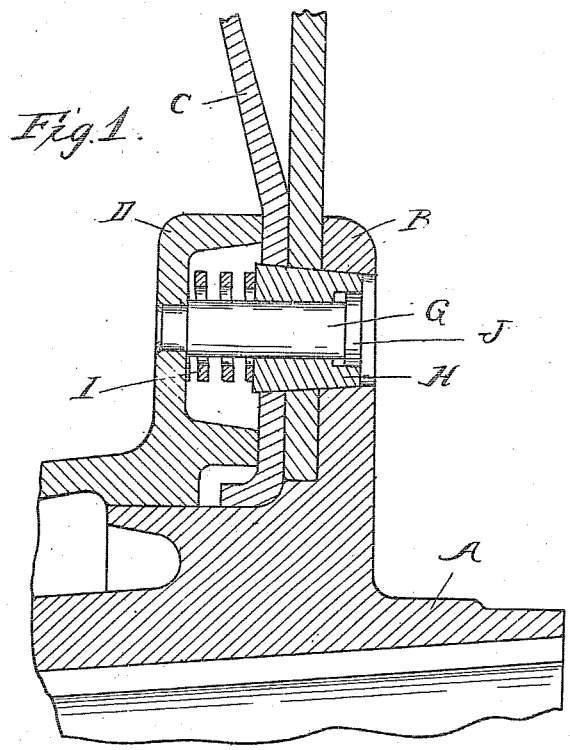
Figure 1 is a section through a portion of the clamping means.
Figure 2:
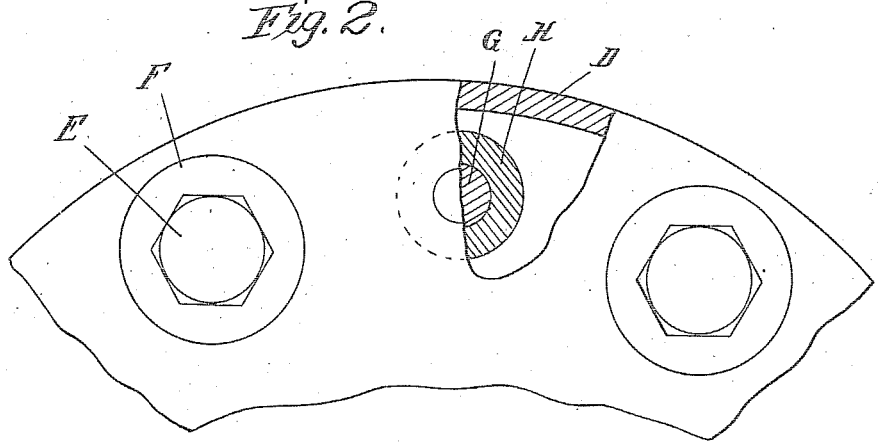
Fig. 2 is an elevation thereof.

A is the hub of the wheel, having the radially-extending annular flange B projecting therefrom. C is a disk wheel demountably secured to the hub A, being clamped against the flange B by suitable means such as the clamping ring D and coöperating clamping studs and nuts E and F spaced therearound.

To securely fasten the disk in position and also to transmit the torque to the same from the hub it is desirable to provide pins or studs which engage registering apertures in the two members. It is, however, difficult to manufacture the parts with such accuracy that a series of such pins or studs will accurately register and exactly fit the apertures of the complementary member, and furthermore if such an accurate construction were obtainable it would be a difficult operation to mount or demount the wheel on account of the slight degree of clearance. I have therefore devised a construction which dispenses with the necessity of such accurate workmanship and also facilitates the mounting or demounting of the wheel, the construction being as follows:

G are pins preferably arranged intermediate the clamping studs E and secured to the clamping ring D to project inwardly therefrom. H are sleeves upon the pins G, which are exteriorly tapered and are adapted to engage registering tapered apertures in the disk C and hub flange B. I is a spring sleeved upon the pin G, one end abutting against the ring D and the opposite end against the large end of the tapered sleeve H. J is a head on the inner end of the pin G, which limits the outward movement of the sleeve thereon.

With the construction just described, when the clamping ring D is placed upon the hub the taper sleeves H will engage the registering apertures in the disk C and flange B, and on account of the taper this engagement is effected without the necessity of exact registration. The ring D is then clamped in position by tightening the nuts F on the studs E and the pressure is applied through the springs I to the taper sleeves H, forcing them to their seats. The springs I may be made of sufficient tension to force the sleeves into firm contact and at the same time, as each sleeve is independently yieldable, its setting is not dependent upon any other. When once seated the angle of the taper being comparatively slight will be within the angle of friction so that the driving torque will have no tendency to displace the sleeves.

What I claim as my invention is:

1. In a wheel the combination with complementary members having abutting portions, of clamping means for securing said abutting members to each other, and a tapering driving pin yieldably pressed by said clamping member and engaging correspondingly tapered registering apertures in said complementary members.

2. In a wheel the combination with complementary members having abutting portions, of clamping means for securing said members to each other, and a series of tapering pins yieldably secured to one of said members and engaging correspondingly tapered registering apertures in the complementary member.

3. In a wheel the combination with a hub and demountable wheel section having abutting portions, of clamping means for securing the abutting portions to each other, a series of tapering pins for engaging registering tapering apertures in the abutting portions, and means for yieldably forcing said pins to their seats by said clamping means.

4. In a wheel, the combination with a hub having a radially-extending annular flange, of a disk wheel engaging said hub adjacent to said flange, a clamping ring for securing said disk to said flange, a pin secured to said clamping ring and projecting inward therefrom, a tapered sleeve slidable upon said pin and engageable with registering tapering apertures in said disk and flange, and means for yieldably and resiliently pressing said sleeve to its seat.

5. In a wheel, the combination with a hub and wheel section demountably carried by said hub, of clamping members between which said wheel section is engaged, one of said members being integrally formed with said hub, a series of tapering pins for engaging registering apertures in said wheel section and in one of said clamping members, and means engaged between said pins and the other clamping member yieldably pressing said pins to their seats.

6. In a wheel, the combination with a hub and demountable wheel section having abutting portions, of clamping means for securing said abutting portions to each other comprising a clamping ring and a series of fastenings between said ring and said abutting portions, and a series of tapering pins alternating with said fastening devices and yieldably secured to said ring and engaging correspondingly tapered registered apertures in said hub and wheel section.

In testimony whereof I affix my signature.

ALDEN L. PUTNAM.